Figure 1:
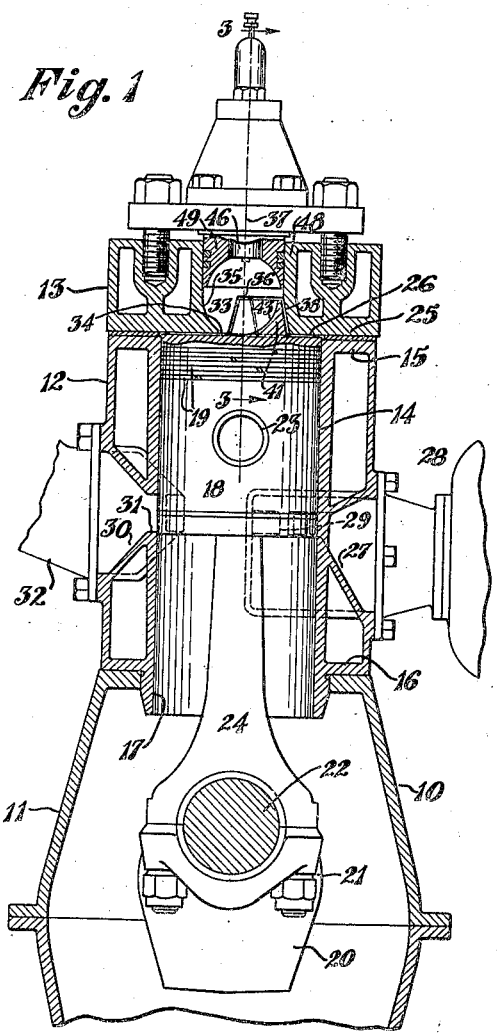

Aug. 31, 1937.　　　　O. D. TREIBER　　　2,091,894
TWO-CYCLE INTERNAL COMBUSTION ENGINE
Filed May 21, 1935　　　2 Sheets-Sheet 1

Inventor
O. D. Treiber
By Kresse and Bishop
Attorneys

Aug. 31, 1937.　　　　O. D. TREIBER　　　　2,091,894

TWO-CYCLE INTERNAL COMBUSTION ENGINE

Filed May 21, 1935　　　　2 Sheets-Sheet 2

Inventor

O. D. Treiber

By Frease and Bishop

Attorneys

Patented Aug. 31, 1937

2,091,894

UNITED STATES PATENT OFFICE 2,091,894

TWO-CYCLE INTERNAL COMBUSTION ENGINE

Otis D. Treiber, Canton, Ohio, assignor to Hercules Motors Corporation, Canton, Ohio, a corporation of Ohio Application May 21, 1935, Serial No. 22,582

2 Claims. (Cl. 123—32)

My invention relates in general to two cycle internal combustion engines having one or more cylinders and one or more auxiliary mixing, compression, and combustion chambers, each auxiliary chamber having curved inner faces located in part in the cylinder head.

An engine of such general type may be a compression ignition and solid fuel injection engine, or may be a spark or glow tube ignition engine and/or utilize carbureted or premixed charges of liquid fuel and air.

More particularly, however, my invention relates to a two cycle compression ignition, solid fuel injection internal combustion engine having a curved auxiliary mixing, compression, and combustion chamber for each cylinder.

In general, from the standpoint of construction, any two cycle engine is relatively economical to manufacture, as compared with a four cycle engine, because the two cycle engine eliminates the valve gear necessarily present in a four cycle engine.

From another standpoint, in any compression ignition solid fuel injection engine, it is necessary that the injected atomized fuel be mixed with the combustion supporting medium, usually air, in a very short space of time, such mixing being coincident with a rise in pressure of the fuel and air mixture to the ignition point, after which the resulting combustion of the mixture must be sufficiently rapid, from the standpoint of efficiency, without being too rapid so as to cause disruptive unit pressures.

In addition to the foregoing, in a two cycle compression ignition engine, it is necessary to effect scavenging of the products of combustion at the end of the power stroke of the piston, usually with the assistance of incoming air under pressure, which air is further compressed by the piston on the compression stroke, mixed with the fuel injected into the combustion chamber or chamber portion, and ignited and burned as aforesaid.

In the four cycle compression ignition internal combustion engine set forth in my prior U. S. Patent No. 1,960,093, the problem of the mixing, the compression and the combustion of injected solid fuel and air in a high speed four cycle engine has been satisfactorily solved in an improved manner by the use of a construction which imparts a controlled high velocity swirling or turbulence to the fuel and air in the auxiliary chamber.

The objects of the present improvements include the provision of a two cycle engine, preferably a compression ignition solid fuel injection internal combustion engine, and in which the mixing, the compression, and the combustion of injected solid fuel and air is carried out in a manner analogous to that set forth for the four cycle compression ignition internal combustion engine of said Patent No. 1,960,093, and of such nature that a controlled high velocity swirling or turbulence is imparted to the fuel and air.

Further objects of the present improvements include the provision of an improved structure and mode of operation for an auxiliary mixing, compression, and combustion chamber of an internal combustion engine, regardless of the type of fuel or type of ignition used.

Further objects of the present improvements include the provision of an improved auxiliary chamber construction for internal combustion engines in which solid fuel is injected into the auxiliary chamber, and which is so arranged that the direction of the fuel spray may be varied with relative ease.

The foregoing and other objects are attained by the improvements, apparatus, parts, combinations, and sub-combinations, which comprise the present invention, and the nature of which is set forth in the following general statement, and preferred embodiments of which, together with their mode of use are set forth in the following description, and which are particularly and distinctly pointed out and set forth in the appended claims forming part hereof.

The nature of the improvements of the present invention may be described in general terms as including in an internal combustion engine, one or more cylinders and one or more auxiliary chamber forming compartments or pockets, each compartment or pocket being associated with one of the cylinders and being located in the cylinder head of the engine opposite the crown or end face of the piston operating in the cylinder, and the cylinder crown or end face having auxiliary chamber and baffle wall forming faces provided on an extension of the piston, the piston extension coacting with the cylinder head pocket on the compression stroke of the piston to direct the flow of air into the pocket, and the piston extension also coacting with the pocket to form a preferably spherical auxiliary mixing, compression and combustion chamber as the piston nears, reaches, and retreats from the end of its compression stroke.

The coacting faces of the cylinder head pocket and of the piston extension thus produce a controlled swirling motion or turbulence of the air and fuel in the auxiliary chamber formed thereby, so that the mixing, compression, and combustion of the fuel are attained in an effective manner.

The cylinder head pocket is preferably formed by separable parts into one of which a fuel injecting nozzle extends and is mounted in such manner as to permit a simple modification thereof to change the direction of the longitudinal axis of the fuel spray injected into the mixing, compression and combustion chamber.

Figure 2:
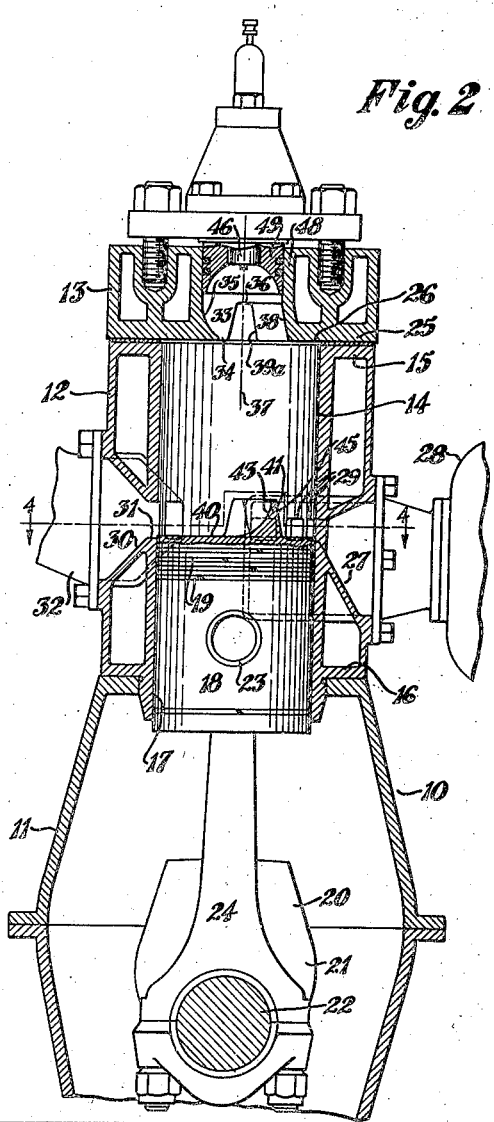
Figure 3:
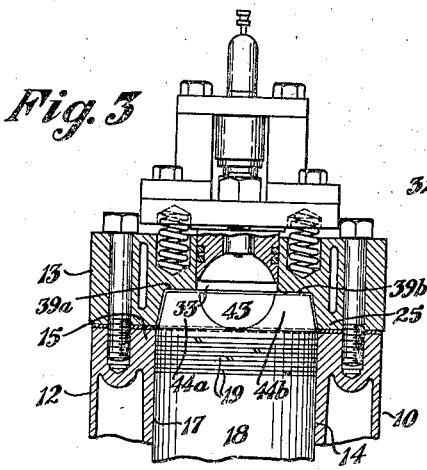
Figure 4:
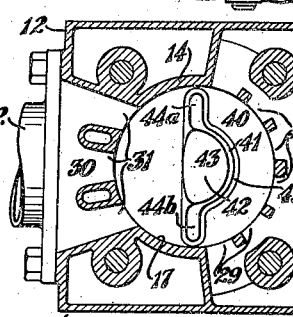
Figure 5:
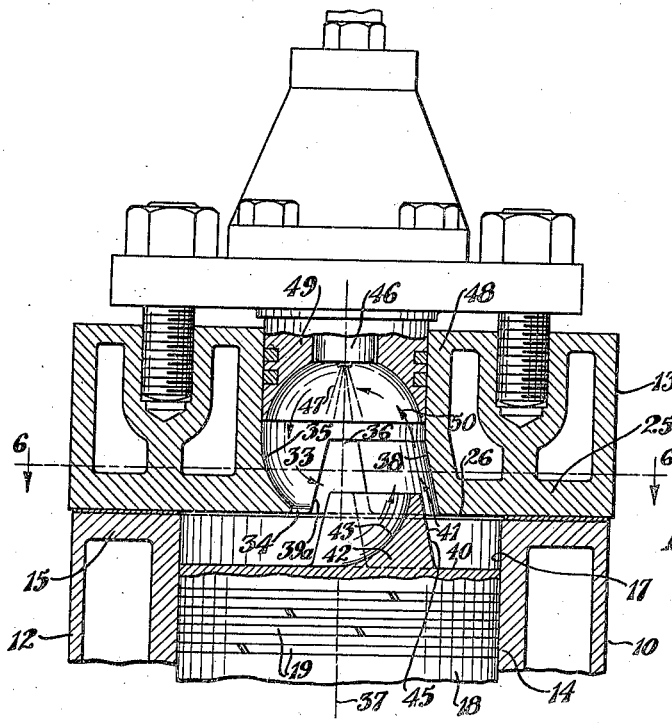
Figure 6:
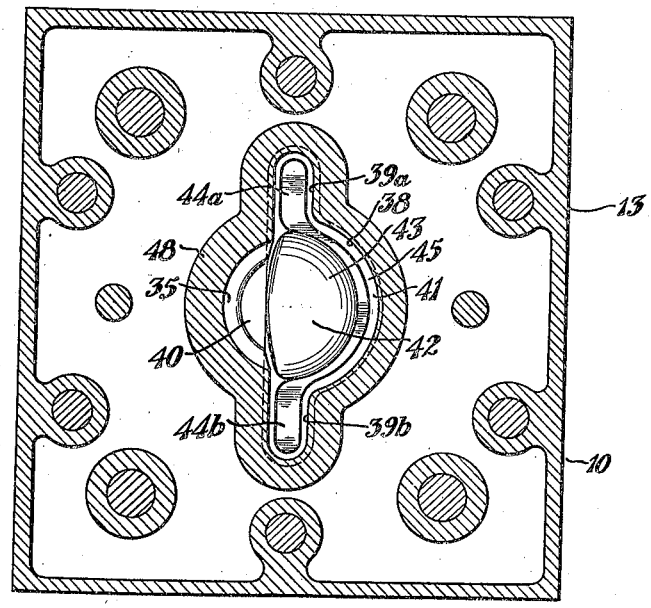

Preferred embodiments of the present improvements in a compression ignition, solid fuel injection internal combustion engine, are illustrated in the accompanying drawings forming part hereof, in which Figure 1 is an elevation view, with portions broken away and shown in section on a plane containing the longitudinal axis of the cylinder and piston, of a two cycle, compression ignition, solid fuel injection internal combustion engine embodying the present improvements, the piston of the engine being shown in its extreme position of displacement towards the cylinder head and away from the crank shaft at the end of the compression stroke of the piston;

Fig. 2, a view similar to Fig. 1, with the piston being shown in its extreme position of displacement away from the cylinder head and towards the crank shaft at the end of the power and exhaust or scavenging stroke of the piston;

Fig. 3, a fragmentary view of the upper portions of the engine with the parts in their relative positions of Fig. 1, with portions broken away and shown in section on a plane at right angles to the plane of Fig. 1 and passing through the longitudinal axis of the cylinder and piston, as indicated by the line and arrows 3—3, Fig. 1;

Fig. 4, a plan sectional view of the engine as on line 4—4, Fig. 2;

Fig. 5, an enlarged view similar to Figs. 1 and 2 but showing the piston as it is approaching the cylinder head; and Fig. 6, a plan sectional view thereof as on line 6—6, Fig. 5.

Similar numerals refer to similar parts throughout the drawings.

The engine illustrated in the drawings and including preferred embodiments of the present improvements is indicated generally at 10 and is a single cylinder, two stroke cycle, single action compression ignition internal combustion engine.

The engine 10, includes in combination with other usual parts of an internal combustion engine, a crank case 11, a cylinder block 12, and a cylinder head 13.

The cylinder block 12 includes therein walls forming the cylinder 14, and as shown the cylinder 14 is part of a cylinder block casting and extends from the normally upper cylinder block wall 15 through and below the normally lower cylinder block wall 16.

The cylinder head 13, the cylinder block 12, and the crank case 11 are separable as illustrated, and joined together in a usual manner by bolt means, some of which are shown and some of which are not shown on the drawings.

In the bore 17 of the cylinder 14, a piston 18 provided with piston rings 19 is operatively mounted for reciprocation in a usual manner.

A crank shaft 20 is operatively mounted in a usual manner in bearing blocks, not shown, and the crank shaft 20 includes opposite the piston 18, crank arms 21, one of which is shown, and between the outer ends of which extends a crank pin 22, and the piston 18 has mounted therein in a usual manner a wrist pin 23, and a connecting rod 24 operatively connects the crank pin 22 with the wrist pin 23.

The cylinder head 13 includes a normally lower wall 25 having a preferably flat normally lower surface 26 extending transversely across the normally upper end of the bore 17 of the cylinder 14.

Intermediate the ends of the cylinder 14, the cylinder block 12 includes walls forming a segmental air intake chamber indicated generally by 27, which is supplied with air as from a blower indicated fragmentarily at 28, and the chamber 27 communicates with the interior of the cylinder bore through ports 29 at one side of the cylinder.

At the opposite side of the cylinder, the cylinder block 12 has walls therein forming a segmental exhaust chamber 30 which receives exhaust gases from the cylinder through ports 31, and the chamber 30 communicates with an exhaust manifold connected with the cylinder block and shown fragmentarily at 32.

Walls of the cylinder head 13 form a pocket indicated generally by 33 opening at 34 through the cylinder head lower wall 25 into the cylinder head end of the cylinder bore 17.

The pocket 33 includes a first concavely curved surface 35, which is preferably symmetrical about an axis extending through its center at 36 and at right angles to the longitudinal axis 37 of the cylinder, and the symmetrical curved surface 35 as illustrated is preferably a spherical curved surface.

The pocket 33 also includes a second concavely curved surface 38 which is preferably substantially tangential with respect to the spherical surface 35, and which as illustrated is a conical surface located at one side of the axis 37 and curved about the axis 37, the conical surface 38 flaring outwardly from the axis 37 as it approaches the cylinder bore.

The pocket 33 also as illustrated includes relatively narrow baffle fin receiving socket grooves 39a and 39b which are located opposite each other one on each side of the concavely curved faces of the pocket, and each groove 39a and 39b opens sidewise towards the other and into the concavely curved faces of the pocket.

The crown or end face 40 of the piston 18 has an extension indicated generally by 41 thereon which protrudes towards the cylinder head 13.

The piston extension 41 includes on its central portion 42 a concavely curved face 43 and baffle fins 44a and 44b extend from opposite sides of the central portion 42 of the piston extension 41.

The piston extension 41 also has a convexly curved face 45 which is similar to the concavely curved surface or face 38 of the pocket 33, and the convex face 45 substantially interfits with the face 38 when the piston is closest to the cylinder head.

In this extreme position of displacement of the piston towards the cylinder head, the piston extension 41 and its parts interfit into the pocket 33, the baffle fins 44a and 44b extending into the baffle fin receiving socket grooves 39a and 39b, respectively, and the concavely curved face 43 of the piston extension 41 being preferably spherical as shown, and coacting with the spherical curved surface or face 35 of the pocket to form a spherical combustion chamber when the piston approaches and reaches closest to and recedes from the cylinder head.

Means for injecting the preferred liquid hydrocarbon fuel into the pocket 33 includes the pintle nozzle 46 which is communicatingly connected in a usual manner by a tube, not shown, with a fuel supply pump, not shown.

The nozzle 46 is of usual construction, and is adapted to introduce into the pocket 33 an atomized conical spray 47 of fuel particles which as illustrated has its origin located directly above the cylinder head and the axis of the fuel spray coincides with the longitudinal axis 37 of the cylinder.

The pocket 33 as illustrated is formed partly in the cylinder head casting 48, and partly by a removable plug member 49.

If it is desired to change the direction of the axis of the fuel spray in the present improvements, the change may be easily effected by providing another plug member having a different bore for receiving the nozzle 46.

In the operation of the engine 10, when the piston is in its extreme position of displacement away from the cylinder head as shown in Fig. 2, the intake ports 29, and also the exhaust ports 31 have been opened by the piston and the products of combustion in the cylinder bore escape out through the exhaust ports 31, being assisted or scavenged by the incoming air entering the intake ports 29 under pressure.

As the piston moves on the next stroke towards the cylinder head, the convexly curved face 45 and the adjacent faces of the fins 44a and 44b of the piston extension serve as baffle faces to direct the incoming air upwardly and then downwardly over the piston extension to thoroughly scavenge the cylinder bore.

As the piston approaches nearer and nearer to the cylinder head, the pressure of the entrapped air charge is increased and the several faces of the piston extension form with the several faces of the pocket a varying volume internally concavely curved combustion chamber and a varying volume tangential passageway thereinto as best shown in Fig. 5, the air flowing in the direction of the arrows 50 in Fig. 5, and being forced into a swirling motion between the concavely curved faces of the pocket and the piston extension.

The charge of fuel is injected as the piston comes closest to the cylinder head and the ensuing mixing and combustion with the swirling air is very effective, and is analogous to that attained by the four stroke cycle engine of said U. S. Patent No. 1,960,093.

I claim:

1. In a two cycle compression ignition internal combustion engine, a cylinder having a bore extending therethrough, a cylinder head closing one end of the cylinder bore, a piston reciprocating in the cylinder bore, the cylinder having inlet and exhaust ports in its sides adapted to be covered and uncovered by the piston, the cylinder head having formed therein a pocket with a first concavely curved internal face opening towards the piston, the piston having an extension on its end opposite the cylinder head, the piston extension including a concavely curved face adapted to coact with the first concavely curved face of the pocket to form an internally curved combustion chamber as the piston approaches and reaches closest to and recedes from the cylinder head, and means for injecting fuel into the pocket, the pocket also having at one side a second concavely curved face substantially tangential with the first concavely curved face, the second curved face being curved about the longitudinal axis of the cylinder bore, and the cylinder extension including a convexly curved face at one side of the concavely curved face, the convexly curved face of the cylinder extension being similar to the second concavely curved face of the cylinder head pocket, and the extension convexly curved face substantially interfitting with the second concavely curved face of the pocket when the piston reaches closest to the cylinder head.

2. In an internal combustion engine, a cylinder having a bore extending therethrough, a cylinder head closing one end of the cylinder bore, a piston reciprocating in the cylinder bore, the cylinder head having formed therein a pocket with a spherical curved internal face opening towards the piston, the pocket also having at one side a concavely curved face substantially tangential with the spherical face, the tangential face being curved about the longitudinal axis of the cylinder bore, the piston having an extension on its end opposite the cylinder head, and the piston extension including a spherical curved face adapted to coact with the spherical curved face of the pocket to form an internally curved combustion chamber as the piston approaches and reaches closest to and recedes from the cylinder head and the cylinder extension including a convexly curved face at one side of the spherical face, the convexly curved face of the cylindrical face, the convexly curved face of the cylinder extension being similar to the concavely curved face of the cylinder head pocket, and the extension convexly curved face substantially interfitting with the concavely curved face of the pocket when the piston reaches closest to the cylinder head.

OTIS D. TREIBER.